United States Patent [19] [11] 3,879,531
Ariyan et al. [45] Apr. 22, 1975

[54] 2-AMINOTHIAZOLES COMPOSITIONS AND METHODS FOR USING THEM AS PSYCHOTHERAPEUTIC AGENTS

[75] Inventors: Zaven S. Ariyan, Woodbury, Conn.; Marshall Kulka; William A. Harrison, both of Guelph, Ontario, Canada

[73] Assignees: Uniroyal, Inc., New York, N.Y.; Uniroyal, Ltd., Quebec, Canada

[22] Filed: July 17, 1972

[21] Appl. No.: 272,119

[52] U.S. Cl. ............................ 424/270; 260/306.8 R
[51] Int. Cl. ............................................. A61k 27/00
[58] Field of Search .............. 424/270; 260/306.8 R

[56] References Cited
UNITED STATES PATENTS

| | | | |
|---|---|---|---|
| 3,505,055 | 4/1970 | Von Schmeling et al. | 71/90 |
| 3,547,917 | 1/1971 | Kulka et al. | 71/90 |
| 3,674,871 | 7/1972 | Evans | 424/270 |

*Primary Examiner*—Stanley J. Friedman
*Attorney, Agent, or Firm*—Willard R. Sprowls, Esq.

[57] ABSTRACT

A group of 2-aminothiazoles and their pharmaceutically acceptable salts, including certain novel 2-amino-4-methyl-5-thiazolecarboxamides, have been found to be useful as psychotherapeutic agents in the CNS area for combating anxiety, as hypnotics, and in particular, as anti-aggression agents.

24 Claims, No Drawings

2-AMINOTHIAZOLES COMPOSITIONS AND METHODS FOR USING THEM AS PSYCHOTHERAPEUTIC AGENTS

CROSS REFERENCE TO RELATED APPLICATIONS

This application is related to U.S. Pat. No. 3,547,917 to Kulka et al., all of the contents of which are hereby incorporated herein by reference, which patent discloses methods for preparing the 2-amino-4-methyl-5-thiazolecarboxamides of the present invention.

This application is also related to U.S. Pat. No. 3,505,055 to Von Schmeling et al, which discloses some of the compounds of the present invention as fungicides and plant growth regulants.

This application is also related to our copending application Ser. No. 201,143, filed Nov. 22, 1971, which deals with the use of some of the compounds of the present invention as anti-inflammatory agents.

BACKGROUND OF THE INVENTION

Field of the Invention

The neurochemistry of aggression has recently attracted much attention, and it has long been recognized that aggressive behavior in animals and man can be produced by alterations in ordered brain function. In man, aggressive behavior is often associated with every type of mental disease. Thus, aggression is a major side effect of most mental disorders.

This invention relates to 2-amino-4-methyl-5-thiazolecarboxamides and their pharmaceutically acceptable acid addition salts, including novel compounds as well as compounds heretofore known. The compounds to which the present invention is directed have been found to be highly selective for the abolition of aggressive behavior, generally at doses which cause little or no signs or symptoms of central nervous system depression or toxicity.

The pharmaceutically acceptable acid addition salts include the chlorides, bromides, benzoates, iodides, citrates, sulfinates, sulfonates, acetates and the like. In addition, other suitable salts include the sulfates, nitrates, phosphates, maleates, fumarates, succinates and tartrates. It is believed that, when taken orally, the salts may be buffered and the hydroxide or free base formed. On the other hand, it has been theorized that the acid pH of the stomach (around 2 in humans) due to the presence of HCl causes conversion to the hydrochloride. While not wishing to be bound to any theory of how the compounds of the invention act in vivo, it is also believed possible that the base is the pharmaceutically active compound that is formed from the salts in animal tissue fluid.

It is well accepted in neuropharmacology that there is no clear distinction between sedative-hypnotics and minor tranquilizers. All known minor tranquilizers which are effective in reducing anxiety also produce drowsiness, ataxia (inability to coordinate muscular movements) and sleep when given in larger doses. All sedative-hypnotic drugs in small doses are "anxiolytic" (causing apprehension or anxiety). Sedative hypnotics such as alcohol and short-acting barbiturates tend to produce behavioral excitation prior to promoting drowsiness and sleep. The sedative-hypnotics and minor tranquilizers produce discrete, predictable changes of behavior that can be applied to therapeutic advantage in neurotics. Aside from their ability to promote sleep, their major behavioral actions of therapeutic advantage are their abilities to slightly reduce the level of arousal-excitability, overcome passive avoidance behavior (social withdrawal, suppressed or submissive), slightly diminish aggressive hostility, and increase the response to environmental stimuli. The effect, for example, of a "pyschomimetic" (inducing psychosislike symptoms) drug on animal behavior, such as LSD in rats and cats, has been said to increase "excitement" and "aggression."

Currently, aggressive behavior in mental disease patients is usually controlled by such major tranquilizers as chlorpromazine. This approach to the problem of controlling mental disorders is not entirely satisfactory since patients under the influence of this type of medication are overtly depressed and not able to return satisfactorily to society and to function normally. Chlorpromazine is a strong central nervous system depressant, both in normal and schizophrenic patients. Its most salient feature, however, is the ability to inhibit aggressive behavior in abusive and destructive schizophrenics. It has been the drug of choice for the treatment of so-called "back ward" schizophrenics, and is now used in out-patient therapy in cases of simple schizophrenia. The compound has many side-effects, the most serious of which is that it causes depression at the same time that it alleviates the schizophrenic symptoms. It also has a disadvantage in that it is quite toxic and has caused liver damage and blood disorders.

The abolition of aggressive behavior in schizophrenics without neurotoxicity as characterized by depression would be a most desirable feature for a new drug in the therapy of mental disease. The compounds of the present invention have been found to be agents which selectively block aggressive behavior but do not usually cause significant depression.

Accordingly, in one aspect thereof, the invention is a method of treating aggressive behavior, combating anxiety or inducing hypnosis. In another aspect, the invention is a group of novel 2-amino-4-methyl-5-thiazolecarboxamides. In yet another aspect, the invention is directed to psychotherapeutic pharmaceutical compositions comprising a compound selected from the group consisting of both novel and already known 2-amino-N-benzyl-4-methyl-5-thiazolecarboxamides and their pharmaceutically acceptable acid addition salts.

DESCRIPTION OF THE PRIOR ART

Thiazole derivatives, including numerous 2-aminothiazoles are known. However, none of the known 2-aminothiazole compounds has even been disclosed as having psychotherapeutic properties.

U.S. Pat. No. 3,542,801 to Manning describes certain 2-aminothiazoles (structurally dissimilar to the 2-amino-4-methyl-5-thiazolecarboxamides of the present invention) and discloses them to be useful as hypotensive agents. These compounds have the structure:

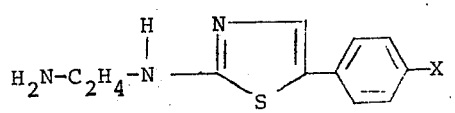

wherein X is a halogen.

Other 2-aminothiazoles, which are also structurally dissimilar to those of the present invention, are disclosed in British Pat. No. 1,188,846 as antiinflamatory and antiviral agents. More particularly, the British patent discloses certain 2-amino-4,5-dianisylthiazoles and a number of other 2-substituted 4,5-dianisylthiazoles as having the foregoing properties.

In addition, South African ZA 6,903,123 discloses a family of thiazoles,

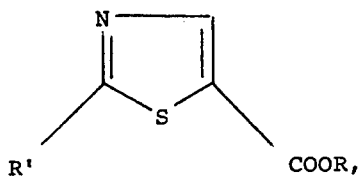

which are also structurally remote from the thiazoles of the present invention, as pharmaceutical compounds. And French FM 6964 discloses, as useful for the treatment of cardiovascular collapse, shock, metabolic acidosis, cancerous conditions and certain forms of obesity and inflammation, 2-aminothiazoles of the formula:

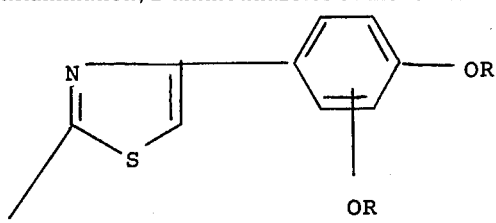

These compounds are also described as being useful as peripheral analgesics.

The U.S. Pat. to Kulka et al (3,547,917), noted above, discloses a broad class of aminothiazoles (including a number of the compounds employed in the present invention) and methods for their preparation, as well as their use as fungicides and plant growth regulants.

According to Kulka et al. patent, aminothiazoles are prepared by well known methods of thiazole synthesis. Thus, as described in Kulka et al., a thioamide of the formula:

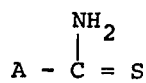

is reacted with an alpha-halocarbonyl compound of the formula:

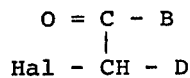

in the presence of a solvent such as water or alcohol with heating, followed by basification to form a compound of the formula:

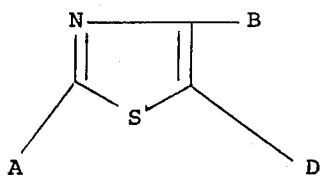

wherein A is an amino or substituted amino group, B is an alkyl group, D is a carbamoyl or a mono- or di-substituted carbamoyl group and Hal is a halogen.

Alternatively, the thioamide may be reacted with $SO_2Cl_2$ and a non-halogenated precursor of the alpha-halocarbonyl compound, that is,

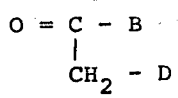

in benzene or toluene to form the hydrochloride of the 2-aminothiazole, after which the free base is recovered therefrom.

The von Schmeling et al U.S. pat. No. (3,505,055), noted above, discloses and claims methods of using the Kulka et al. compounds for agricultural purposes.

SUMMARY OF THE INVENTION

The present invention provides a method of treating CNS disorders, more particularly for combating anxiety and controlling aggressive behavior in an animal subject, generally without causing the central nervous system depression which is a typical side effect of drugs heretofore used to treat aggressive behavior. This is achieved by administering to an animal subject a therapeutically effective amount of a specified 2-aminothiazole. Usually, the amount administered will be from 1 to 75 mg/kg/day of body weight, preferably from about 10 to 40 mg/kg/day.

The invention further provides psychotherapeutic pharmaceutical compositions comprising a psychotherapeutic amount of such 2-aminothiazole.

The 2-aminothiazoles that may be employed in the method and composition of the present invention are 2-amino-4-methyl-5-thiazolecarboxamides having the structure

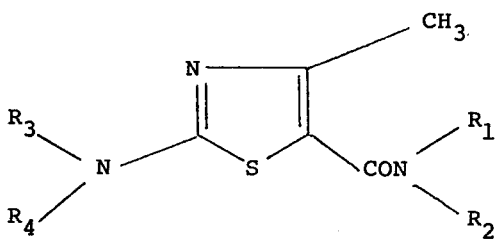

wherein $R_1$ is hydrogen or lower alkyl (e.g., methyl, butyl); $R_2$ is lower alkyl (e.g., butyl), phenyl, phenyl substituted lower alkyl

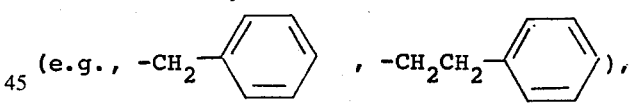

lower alkyl substituted phenyl

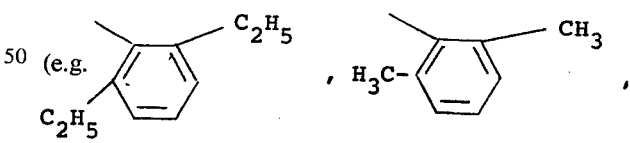

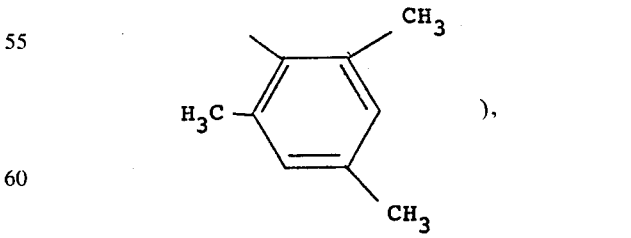

or phenyl substituted lower alkyl wherein the phenyl is lower alkoxy or halogen substituted (e.g.,

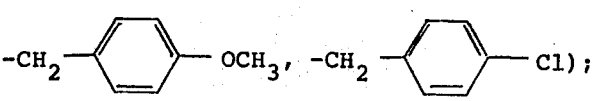

$R_3$ is hydrogen or N=O; and $R_4$ is hydrogen or lower alkyl (e.g., methyl, ethyl), and their pharmaceutically acceptable acid addition salts.

While many of the above defined compounds were previously known, certain of them are novel compounds. More particularly, the novel compounds provided by the present invention are those 2-amino-4-methyl-5-thiazolecarboxamides having the structure

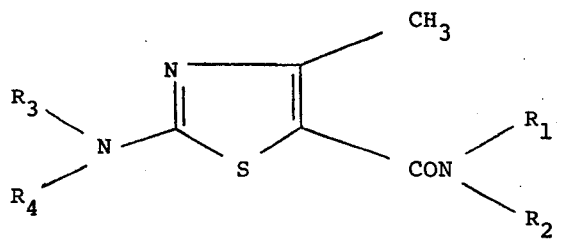

wherein $R_1$, $R_3$ and $R_4$ are each hydrogen and $R_2$ is phenyl substituted alkyl

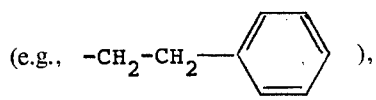

alkoxy phenyl substituted lower alkyl

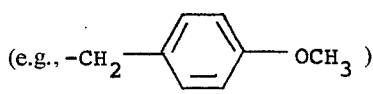

or phenyl substituted lower alkyl wherein the phenyl is halogen substituted

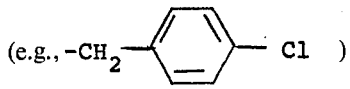

and their pharmaceutically acceptable acid addition salts (e.g., hydrochlorides).

The salts of the present invention may be represented by the formula

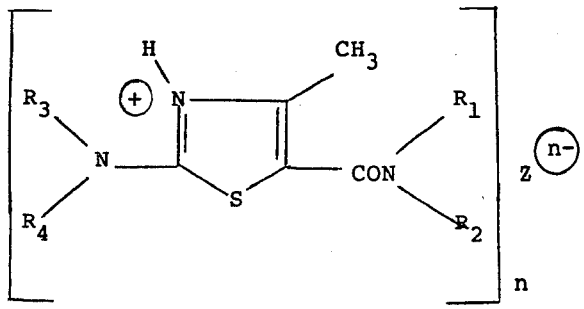

wherein $R_1$, $R_2$, $R_3$ and $R_4$ are as defined above and Z is an anion derived from an acid which is pharmaceutically acceptable and whose pK value is between 0.4 and 6.5, and n is an integer from 1 to 3 equal to the charge on the anion.

The pharmaceutical compositions of the present invention comprise, in combination, a therapeutically effective amount of a compound of the present invention and a pharmaceutically acceptable carrier or diluent therefor.

For example, in the case of a tablet, the composition will comprise, in addition to the active ingredient, fillers, binders and diluents such as lactose, methylcellulose, talc, gum tragacanth, gum aracia, agar, polyvinylpyrrolidone, stearic acid and corn starch. In the case of a liquid suspension for oral administration, the composition will comprise, in addition to the active ingredients, a filler such as sodium carboxymethylcellulose and/or a syrup, e.g., a glycerine based syrup. In the case of a parenteral solution or suspension, the composition will comprise, in addition to the active ingredient, a suitable liquid solvent or dispersant such as a saline solution.

DESCRIPTION OF THE PREFERRED EMBODIMENTS

The preferred psychotherapeutic compounds of the present invention are 2-amino-N-benzyl-4-methyl-5-thiazolecarboxamide and its hydrochloride.

The 2-aminothiazoles of the present invention can be prepared by the methods disclosed in the Kulka et al U.S. Pat. No. (3,547,917).

The method is the reaction sequence which comprises reacting an alpha-halocarbonyl compound of the formula:

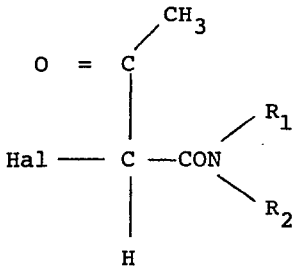

and a thioamide (thiourea) of the formula:

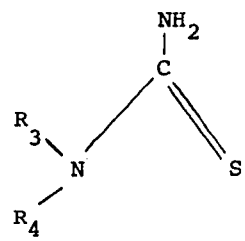

wherein $R_1$, $R_2$, $R_3$ and $R_4$ are as defined above and Hal is a halogen, to form the hydrohalide salt of the 2-aminothiazole derivative of the formula (A):

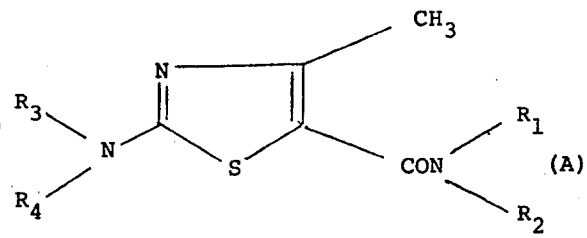

The free base is obtained from the hydrohalide salt by basification with an alkali such as ammonium hydroxide, an alkali metal hydroxide, NaHCO$_3$, etc.

The actual preparation of the 2-aminothiazole derivatives consists of mixing the α-halocarbonyl compound with the thioamide (excess thioamide may be used) in the presence of a suitable solvent such as water or alcohol and heating the mixture on the steam bath for a short time (15 minutes to 2 hours) followed by basification. The precipitated aminothiazole is filtered off, and washed with water and with benzene. The aminothiazoles are insoluble in benzene, and this enables their preparation from crude α-halocarbonyl compounds because the impurities present in such a crude starting material are usually benzene-soluble and may be washed out of the end product.

Alternatively, the reaction may be carried out in one step by mixing together the thioamide, the unhalogenated precursor of the α-halocarbonyl compound, i.e.,

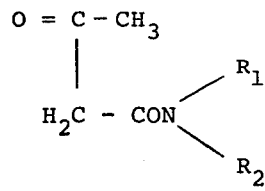

and sulfuryl chloride in benzene or toluene, heating for a short time and then recovering the 2-aminothiazole from its hydrohalide.

As previously stated, the Kulka et al patent discloses and exemplifies the preparation of many of the compounds of the present invention using the above-described methods. For the sake of convenience and completeness however, there follow working examples showing the preparation of some of the present compounds. It will be understood, of course, that the Kulka et al methods are also applicable to the preparation of all of the compounds of the present invention.

EXAMPLE 1

2-amino-N-benzyl-4-methyl-5-thiazolecarboxamide, its hydrochloride and sulfate

To a suspension of N-benzylacetoacetamide (30 g.) in benzene (100 ml) was added portionwise sulfuryl chloride (23 g.-11 percent excess) over 10 minutes keeping the temperature at 20°–25° by cooling. The resulting solution was allowed to stand at room temperature for 2 hours and then the solvent was removed in vacuo at a temperature not greater than 50°C. To the residual crude alphachloro-N-benzylacetoacetamide was added a solution of thiourea (20 g.) in water (50 ml.) and ethanol (50 ml.) and the reaction mixture was heated under reflux for 15 minutes. The ethanol was distilled off, the aqueous residual solution was basified with sodium hydroxide, and, the white precipitate was filtered, washed with water and with benzene and dried. Crystallization from benzene-isopropyl alcohol (10:1) yielded 23 g. or 60 percent of a white solid melting at 143°–145°C. Recrystallization from ethyl acetate raised the melting point of the product to 152°–154°C.

A precipitate of the hydrochloride (Compound 2, m.p. 200°–205° (decomp.), was obtained in 79 percent yield when excess hydrogen chloride was passed into a solution of the product in ethanol-ethyl acetate (1:1).

The sulfate, m.p. 220°–226° (decomp.), was prepared in 84% yield by adding a cold solution of sulfuric acid (5 g., 0.051 mole) in absolute ethanol (100 ml.) to a solution of the aminothiazole (24.7 g., 0.10 mole) in absolute ethanol (200 ml.).

EXAMPLE 2

2-amino-N-methoxybenzyl)-4-methyl-5-thiazolecarboxamide and its hydrochloride

Crude 2-chloro-N-(p-methoxybenzyl)acetoacetamide was prepared by adding sulfuryl chloride (13.5 g.) dropwise to a cooled (<20°C) suspension of N-(p-methoxybenzyl)acetoacetamide (22.1 g.) in benzene (100 ml.). The mixture was stirred for about two hours at room temperature, the solvent and volatile reaction products were evaporated under reduced pressure, and the residue heated to 70°C for 30 minutes with ethanol (100 ml.) and thiourea (7.6 g.). The reaction mixture was cooled, diluted with water (150 ml.) and basified with aqueous ammonia. The precipitated solid was dissolved in dilute hydrochloric acid, the solution shaken with a little chloroform, and the aqueous layer separated and basified with aqueous ammonia. The reprecipitated product was recrystallized from ethyl acetate/ethanol (4:1). White crystals were obtained (15.0 g., 54 percent yield) which melted at 155°–157°C.

The hydrochloride, m.p. 198°–202°C, was prepared in 88% yield by passing a slight excess of dry hydrogen chloride into a cold solution of the aminothiazole in acetone.

The 4-methyl-2-(N-nitrosomethylamino)-5-N-phenylthiazolecarboxamide of the present invention was prepared by reacting 4-methyl-2-(methylamino-5-N-phenyl-thiazolecarboxamide with dilute hydrochloric acid and sodium nitrite under conditions similar to those used by Bulka et al [Chem. Ber. 98, 259 (1965); C.A. 62 10426e] to make the corresponding ethyl ester.

The foregoing and other 2-aminothiazoles which were prepared are set forth in Table I below together with the results of the isolated fighting mouse antiaggression screening test. The preparations of thiazole compounds shown in detail in Examples 1 and 2 are representative of the methods employed for preparing the compounds of the present invention.

TABLE I

2-AMINO-4-METHYL-5-THIAZOLECARBOXAMIDES

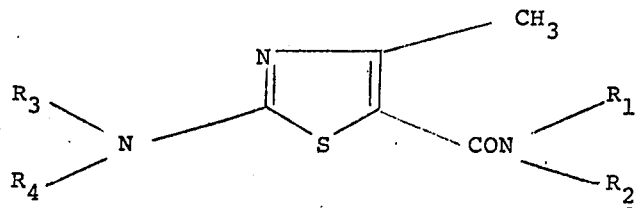

| Compound | $R_1$ | $R_2$ | $R_3$ | $R_4$ | M.P.,°C | Yield % | IFM* % protected | $ED_{50}$ mg/kg |
|---|---|---|---|---|---|---|---|---|
| 1 | H | CH₂Ph | H | H | 143–145 | 60 | 80 | 26.2(22.9–29.9) |
| 2 | H | CH₂Ph . HCl | H | H | 200–205d. | 79 | | 25.5(14.2–45.6) |
| 3 | H | CH₂Ph . (p Cl) | H | H | 205–207d. | — | 40 | |

Table I—Continued

| Compound | $R_1$ | $R_2$ | $R_3$ | $R_4$ | M.P., °C | Yield % | IFM* % protected | $ED_{50}$ mg/kg |
| --- | --- | --- | --- | --- | --- | --- | --- | --- |
| 4 | H | $CH_2Ph$ . (p OMe) | H | H | 155–157 | 54 | 60 | |
| 5 | H | $CH_2Ph$ . (p OMe).HCl | H | H | 198–202 | 88 | 40 | |
| 6 | H | $CH_2CH_2Ph$ | H | H | 180–182 | 69 | 70 | |
| 7 | H | Ph . (2,6-di-Me) | H | H | 249–252d. | 69 | 100 | 29.1(26–32.6) |
| 8 | H | Ph . (2,6-di-Et) | H | H | 206–209 | 60 | 40 | |
| 9 | H | Ph . (2,6-di-Et) | H | Et | 205–207 | — | 60 | 34.5 (orally inactive) |
| 10 | H | Ph . (2,4,6-tri-Me) | H | Me | 247–249 | — | 100 | 19.8(16.7–22.3) |
| 11 | H | Ph | N=O | Me | 138.5–140.5 | 37 | 80 | 19.9(16.8–23.5) |
| 12 | Me | $CH_2Ph$ | H | H | 173–175 | 65 | 40 | |
| 13 | nBu | nBu | H | H | 135–136 | 70 | 40 | |

*IFM - isolated fighting mouse test at a dose of 30 mg/kg intraperitonal; those compounds which protected at least 40% of the mice in this test were considered to be active.

Testing for Antiagression Activity

Since the advent of the treatment of mental disease with phenothiazine derivatives, classically represented by chlorpromazine, more than two hundred test procedures in animals have been devised for the discovery of antipsychotic agents. Many of the procedures are non-specific and are based on side effects of the currently used phenothiazines. Experimentally, in animals, the phenothiazine derivatives produced marked depression of spontaneous motor activity, and ptosis, and have been shown to potentiate pentobarbital sleeping time and to specifically block avoidance in the conditioned avoidance response procedure. Escape behavior was not eliminated, thus distinguishing phenothiazine derivatives from non-specific central nervous system depressants such as pentobarbital. Many test procedures have been devised using the above pharmacological activities as the basis for discovering new neuroleptics, which abolish aggressive behavior in animals. Unfortunately, the dose of the currently used phenothiazine derivatives necessary to abolish aggression also produces marked neurotoxicity. Accordingly, agents that abolish aggressive behavior in doses which do not otherwise affect the behavior of the animal overtly or cause neurotoxicity are highly sought after.

The most outstanding property of the compounds of the present invention, and particularly the preferred 2-amino-N-benzyl-4-methyl-5-thiazolecarboxamide, is the highly selective abolition of aggressive behavior in doses which cause little or no signs or symptoms of central nervous system depression or toxicity. Two models of aggression are used in the primary screening for neuroleptics:

1. isolation-induced fighting in mice and 2) aggression induced in rats by destruction of the septal area (septal rat). Compounds are first submitted to the neuropharmacological profile* and those agents which cause depression over a wide dose range are then submitted to the insolation-induced fighting mouse assay. As indicated in Table I, compounds which protect at least 40 percent of the mice in this test are considered to be active as antiaggression agents. Tests for neurotoxicity are performed concomitantly with the antiaggression tests. Potency ratios are established between the dose which causes neurotoxicity and that dose which abolishes aggressive behavior. Compounds having a potency ratio of greater than one are considered promising candidates for further developmental work.

*The neuropharmacological profile is a standard procedure (see, e.g. Samuel Irwin, Science, 136, 123 [1962])employed in screening a compound to determine its usefulness as a Central Nervous System active compound. When a compound is found to have sufficient activity to warrant follow-up, the first antiaggression screen, the fighting mouse assay, is determined.

Since it possesses outstanding antiaggressive activity in doses which cause little or no signs of central nervous system depression, 2-amino-N-benzyl-4-methyl-5-thiazolecarboxamide differs from known psychoactive agents, all of which cause marked depression in experimental animals. Thus, 2-amino-N-benzyl-4-methyl-5-thiazolecarboxamide inhibits the aggressive behavior of septal rats and inhibits isolation-induced fighting behavior in mice in doses much below that required to produce central nervous system depression or other signs of neurotoxicity. A direct comparison with known psychoactive agents, such as the major and minor tranquilizers, is difficult. However, in a comparative study with a major tranquilizer, chlorpromazine, and a minor tranquilizer, chlordiazepoxide, 2-amino-N-benzyl-4-methyl-5-thiazolecarboxamide was found to be by far the most selective in inhibiting aggressive behavior. It resembles chlorpromazine only insofar as it displays weak alpha-adrenergic blocking activity, as demonstrated by its (1) ability to antagonize amphetamine aggregation-induced lethality and (2) diminution of the pressor response to epinephrine. It resembles chlordiazepoxide in its ability to block electroshock-induced fighting in mice. 2-amino-N-benzyl-4-methyl-5-thiazolecarboxamide does protect against maximal electroshock seizures, but has no effect on the seizures induced by pentylenetetrazol. It displays weak activity in reducing normal body temperature and only moderately potentiates pentobarbital sleeping time. It has no antidepressant activity since it failed to (1) potentiate dihydroxphenyl-alanineinduced fighting behavior in mice, (2) potentiate lethality induced by yohimbine, and (3) antagonize tetrabenzaine-induced ptosis. 2-amino-N-benzyl-4-methyl-5-thiazolecarboxamide possesses specific antiaggressive activity in mice and rats in low doses, fails to cause marked depression or reduction in motor activity in higher doses, and is relatively non-toxic in both mice and rats. It has about the same toxicity as chlordiazepoxide in mice, but in rats is relatively non-toxic when administered orally.

2-amino-N-benzyl-4-methyl-5-thiazolecarboxamide was studied in the neuropharmacological profile, which, as previously indicated, is a standardized multi-dimensional observation technique using mice to grade symptomatology and evaluate acute toxicity relative to dosage. At 300 mg./kg., 2-amino-N-benzyl-4-methyl-5-thiazolecarboxamide produced a loss of righting reflex accompanied by mild tonic convulsions. These effects occurred five minutes after injection. At 100 mg./kg., there was a generalized hyporeflexia, followed by mild tonic convulsions; and other signs of tonic behavior were exhibited, such as modified Straub tail and opisthotonus. This dose protected against maximal electroshock seizure one-half hour after drug administration.

Lower dose levels produced mild depression and some reduction in motor activity, but all reflexes remained within the normal limits. At the 30 and 10 mg./kg. dose levels, the onset of activity occurred in approximately 15–20 minutes and the effects lasted several hours. Analysis of these symptoms indicates that 2-amino-N-benzyl-4-methyl-5-thiazolecarboxamide is a weak central nervous system depressant.

Spontaneous Locomotor Activity 2-amino-N-benzyl-4-methyl-5-thiazolecarboxamide and two commonly used tranquilizers were subjected to the spontaneous locomotor activity test, in which six mice or rats per dose were placed in individual photocell activity cages 30 minutes (mice) or 60 minutes (rats) after i.p. (intraperitoneal) administration of the drug for a 30 minute activity count. Table II shows the results obtained by comparing drug-treated groups with control activity, the $SD_{50}$ being that dose causing a 50% reduction from control activity.

TABLE II

Spontaneous Locomotor Activity
I.P. $SD_{50}$ (mg./kg.)

|  | MICE | RATS |
|---|---|---|
| 2-amino-N-benzyl-4-methyl-5-thiazole-carboxamide | 33.3 | 81.5 |
| Chlorpromazine | 2.8 | 1.7 |
| Chlordiazepoxide | 12.8 | 14.0 |

2-amino-N-benzyl-4-methyl-5-thiazolecarboxamide appears to possess a much weaker depressant action in both mice and rats in comparison with chlorpromazine (major tranquilizer) and chlordiazepoxide (minor tranquilizer).

In addition, 2-amino-N-benzyl-4-methyl-5-thiazolecarboxamide exhibited weak depressant activity when given orally, with an $SD_{50}$ of 123.0 mg./kg. in mice.

Neurotoxicity

In the neurotoxicity test, the value of $NTD_{50}$ is defined as the dose necessary to cause 50% of mice or rats trained to walk a rotating wooden rod (5rpm) to fall at the time of peak effect, and is a measure of drug effects on motor function or central nervous system toxicity. The results set forth in Table III were obtained when 2-amino-N-benzyl-4-methyl-5-thiazolecarboxamide was tested against chlorpromazine and chlordiazepoxide.

TABLE III

| I.P.* | Neurotoxicity $NTD_{50}$ (mg./kg.) MICE | (95% confidence limits) |
|---|---|---|
| 2-amino-N-benzyl-4-methyl-5-thiazole-carboxamide | 100 | (62.8 – 160) |
| Chloropromazine | 0.7 | (0.4 – 1.1) |
| Chlordiazepoxide P.O.** | 13.8 | (7.1 – 27) |
| 2-amino-N-benzyl-4-methyl-5-thiazole-carboxamide | 490 | – 789) |
| Chlorpromazine | 12.1 | (8.5 – 17.3) |
| Chlordiazepoxide | 54 | (38.6 – 75.6) |

Table III – Continued

| I.P.* | Neurotoxicity $NTD_{50}$ (mg./kg.) MICE | (95% confidence limits) |
|---|---|---|
| 2-amino-N-benzyl-4-methyl-5-thiazole-carboxamide | 50 | (30.7 – 81.5) |
| Chlorpromazine | 5.3 | (3.1 – 9.1) |
| Chlordiazepoxide P.O. | 4.3 | (2.6 – 7.1) |
| 2-amino-N-benzyl-4-methyl-5-thiazole-carboxamide | 170 | (89 – 325) |
| Chlorpromazine | 11 | (6.1 – 19.9) |
| Chlordiazepoxide | 11.5 | (8.8 – 15.1) |

*Intraperitoneal
**Oral (Per Os)

Chlorpromazine and chlordiazepoxide produced considerably more neurotoxic signs and symptoms than were observed with 2-amino-N-benzyl-4-methyl-5-thiazolecarboxamide.

Antiaggressive Activity 2-amino-N-benzyl-4-methyl-5-thiazolecarboxamide and its hydrochloride were also compared with chlorpromazine and chlordiazepoxide for antiaggressive activity. Four models of experimentally induced aggression in rodents were studied (R. D. Sofia, Life Science 8: 705, 1969). The results of these experiments are summarized in Table IV.

The results of this study indicate that the 2-amino-N-benzyl-4-methyl-5-thiazolecarboxamide of the present invention possesses selective anti-aggressive activity against isolation-induced aggression and septal rat aggression, which no standard psychotherapeutic agent possesses. In comparison with chlorpromazine and chlordiazepoxide, using the ratio between $NTD_{50}$ and $ED_{50}$ in these models, 2-amino-N-benzyl-4-methyl-5-thiazolecarboxamide possesses a high degree of specificity in combating experimentally induced aggressive behavior. Drug specificity on these studies was considered selective only when it occurred at doses which were significantly lower than those which impaired rotarod performance ($NTD_{50}$) or resulted in a ratio ($NTD_{50/ED\ 50}$) of greater than 1.0. Thus, chlorpromazine and chlordiazepoxide would be considered nonselective in abolishing aggression in the isolated mouse and septal rat assays, since these drugs gave ratios less than 1. 2-amino-N-benzyl-4-methyl-5-thiazolecarboxamide gave ratios of 2.1 and 3.8 in the septal rat and isolated mouse assays when administered intraperitoneally, and 4.3 and 9.8 in the same assays when administered orally. In addition, this degree of selectivity of 2-amino-N-benzyl-4-methyl-5-thiazolecarboxamide for antiaggressive activity is further supported by the fact that it is quite active at doses well below those inhibiting spontaneous locomotor activity. Its hydrochloride also performed outstandingly, with lower effective doses than those of 2-amino-N-benzyl-4-methyl-5-thiazolecarboxamide (except when administered orally in the isolated fighting mouse assay), a similar selectivity ratio (2.9) in the fighting mouse assay when administered intraperitoneally, and an even higher selectivity ratio (10) when administered orally in the septal rat assay.

Electroshock-induced fighting is a test procedure that selectively depicts anti-anxiety activity. 2-amino-N-benzyl-4-methyl-5-thiazolecarboxamide was selectively active in blocking electroshock induced fighting in mice, the ratio being 4.0 upon intraperitoneal injection. In this respect it closely resembles chlordiazepoxide, which gave a ratio of 3.3. 2-amino-N-benzyl-4-methyl-5-thiazolecaroxamide hydrochloride was also selectively active, giving a ratio of 1.75. Chlorpromazine would be considered inactive in this respect since it did block electroshock-induced fighting, but at neurotoxic doses. Orally, 2-amino-N-benzyl-4-methyl-5-thiazolecarboxamide was also more selective than either clorpromazine or chlorpromazine, although all compounds tested were selectively active.

In the killer rat aggression test, upon intraperitoneal injection, 2-amino-N-benzyl-4-methyl-5-thiazolecarboxamide was more specific than clorpromazine and chloropromazine in inhibiting aggression.

2-amino-N-benzyl-4-methyl-5-thiazolecarboxamide is active in protecting mice against maximal electroshock seizures at doses approximately twice that of chlordiazepoxide. Chlorpromazine is completely inactive.

2. Pentylenetetrazol Seizures ($MET_{50}$)

In this test (modification of the method introduced by Everett and Richard, *J. Pharmacol. Exptl. Ther.*, 81: 402, 1944), groups of ten mice each are pretreated i.p. with vehicle and various doses of test compound and placed in Plexiglas squares. 30 minutes later, all mice are injected subcutaneously (s.c.) with pentylenetetrazol at 125 mg./kg. and observed immediately thereafter for convulsions and death for a period of 1 hour.

TABLE IV

ANTIAGGRESSIVE ACTIVITY
$ED_{50}$ (95% confidence limits) (mg./kg.)

| Agent | I.P. $ED_{50}$ | | $NTD_{50}/ED_{50}$ | P.O. $ED_{50}$ | | $NTD_{50}/ED_{50}$ |
|---|---|---|---|---|---|---|
| methyl-5-thiazole-carboxamide | 26.2 | (22.9 – 29.9) | 3.8 | 50.0 | (27.6 – 90.5) | 9.8 |
| 2-amino-N-benzyl-4-methyl-5-thiazole-carboxamide hydrochloride | 25.5 | (14.2 – 45.6) | 2.9 | 92.5 | (58.6 – 146.0) | |
| Chlorpromazine | 2.8 | ( 2.0 – 3.9) | 0.3 | 6.9 | ( 5.1 – 9.4) | 1.8 |
| Chlordiazepoxide | 20.5 | (11.3 – 37.5) | 0.7 | 35.0 | (25.4 – 48.3) | 1.5 |
| Septal Rat Aggression | | | | | | |
| 2-amino-N-benzyl-4-methyl-5-thiazole-carboxamide | 23.5 | (13.1 – 42.3) | 2.1 | 39.9 | (36.9 – 43.1) | 4.3 |
| 2-amino-N-benzyl-4-methyl-5-thiazole-carboxamide hydrochloride | 15.1 | (8.1 – 28.5) | | 21.5 | ( 9.8 – 47.3) | 10.0 |
| Chlorpromazine | 10.7 | ( 4.5 – 25.7) | 0.5 | 11.4 | ( 6.1 – 21.4) | 0.9 |
| Chlordiazepoxide | 25.8 | (14.0 – 47.5) | 0.2 | 23.7 | (13.0 – 59.0) | 0.5 |
| Killer Rat Aggression | | | | | | |
| 2-amino-N-benzyl-4-methyl-5-thiazole-carboxamide | 39.5 | (17.1 – 91.5) | 1.5 | >100 | | |
| 2-amino-N-benzyl-4-methyl-5-thiazole-carboxamide hydrochloride | 14.1 | ( 7.1 – 28.1) | | | | |
| Chlorpromazine | 7.2 | ( 4.3 – 11.8) | 0.7 | 17.4 | (10.1 – 29.8) | 0.6 |
| Chlordiazepoxide | 36.3 | (24.2 – 54.4) | 0.1 | 74.0 | (53.1 –102.8) | 0.2 |
| Electroshock-Induced Fighting in Mice | | | | | | |
| 2-amino-N-benzyl-4-methyl-5-thiazole-carboxamide | 25.0 | (10.6 – 58.8) | 4.0 | 22.5 | (11.3 – 45.0) | 21.8 |
| 2-amino-N-benzyl-4-methyl-5-thiazole-carboxamide hydrochloride | 43.0 | (28.7 – 64.7) | 1.75 | | | |
| Chlorpromazine | 5.5 | ( 3.1 – 9.9) | 0.1 | 0.86 | ( 0.39 – 1.88) | 14.0 |
| Chlordiazepoxide | 4.2 | ( 2.3 – 7.7) | 3.3 | 3.0 | ( 1.7 – 5.4) | 18.0 |

Anticonvulsant Activity

Anticonvulsant activity was tested in the following procedures.

1. Maximal Electroshock Seizures ($MES_{50}$)

In this study, groups of 10 mice each are injected i.p. (intraperitoneally) with vehicle and test drug and placed in individual Plexiglas squares. Thirty minutes after i.p. injection each mouse is administered an electric shock transcorneally at 50 mA intensity, 0.2 seconds duration (Swinyard, et. al., *J. Pharmacol. Exptl.* 106: 319, 1952). The criterion for activity is protection against tonic extension of the hind limbs. The dose necessary to protect 50 percent of the mice ($MES_{50}$) was determined. The following results were obtained:

TABLE V

| Agent | Maximal Electroshock Seizures I.P. $MES_{50}$ mg./kg. |
|---|---|
| 2-amino-N-benzyl-4-methyl-5-thiazolecarboxamide | 33.6 (27.4 – 41.5) |
| Chlorpromazine | Inactive (25 mg./kg.) |
| Chlordiazepoxide | 14.3 (8.4 – 24.3) |

The dose necessary to protect 50 % of the mice ($MET_{50}$) for both parameters was determined and reported in Table VI.

TABLE VI

| Agent | Pentylenetetrazol Seizures I.P. $MET_{50}$ mg./kg. |
|---|---|
| 2-amino-N-benzyl-4-methyl-5-thiazolecarboxamide | Inactive (100 mg./kg.) |
| Chlorpromazine | Inactive (100 mg./kg.) |
| Chlordiazepoxide | 7.1 (5.6 – 90) for convulsions 2.6 (2.2 – 3.1) for death |

Of the drugs tested, only chlordiazepoxide exhibited anti-pentylenetetrazol activity.

d-Amphetamine Aggregation

Protection from d-amphetamine aggregation-induced lethality is usually afforded by alpha-adrenergic-blocking agents such as chlorpromazine, phenoxybenzamine, etc. Percent protection was determined for each compound and an $ED_{50}$ value calculated. The results are summarized in Table VII.

TABLE VII

| Agent | d-Amphetamine Aggregation $ED_{50}$ mg./kg. |
|---|---|
| 2-amino-N-benzyl-4-methyl-5-thiazolecarboxamide | >100 |
| Chlorpromazine | 1.2 (0.8 – 1.8) |
| Chlordiazepoxide | Inactive (50 mg./kg.) |

In this test procedure, 2-amino-N-benzyl-4-methyl-5-thiazolecarboxamide was weakly active, chlordiazepoxide was completely inactive in doses up to 50 mg./kg., and chlorpromazine was very active (this compound is known to possess alphaadrenergic blocking activity). Therefore, 2-amino-N-benzyl-4-methyl-5-thiazolecarboxamide can be considered to possess very weak alpha-adrenergic blocking activity.

Body Temperature

The effects on rectal body temperature of 2-amino-N-benzyl-4-methyl-5-thiazolecarboxamide, chlorpromazine, and chlordiazepoxide in mice were studied in a controlled environment (72°F). Body temperature was recorded immediately before and 15 minutes, 30 minutes, and every hour from one to five following drug administration.

TABLE VIII

Effect on Body Temperature

| Agent | I.P. dose, mg./kg. | Time to peak Activity | Degree C Drop | Duration |
|---|---|---|---|---|
| 2-amino-N-benzyl-4-methyl-5-thiazolecarboxamide | 100 | 1 hour | 2 | 1 hour |
| Chlorpromazine | 2.5 | 1 hour | 8 | 5 hours |
| Chlordiazepoxide | 10 | 3 hours | 1 | 2 hours |

2-amino-N-benzyl-4-methyl-5-thiazolecarboxamide is less active than chlordiazepoxide or chlorpromazine in lowering body temperature.

Drug Interaction Studies

Chlorpromazine and chlordiazepoxide were compared in the following drug interaction studies.

1. Pentobarbital 2-amino-N-benzyl-4-methyl-5-thiazolecarboxamide, chlorpromazine and chlordiazepoxide were administered at various doses intraperitoneally 30 minutes prior to 50 mg./kg. i.p. injection of sodium pentobarbital. This procedure detects compounds which possess analeptic or potentiating properties. The duration of sleeping time, as measured by loss of righting reflex, was determined. The results are presented as percent of control sleeping time and are shown in Table IX.

TABLE IX

% of Increase in Control Sleep Time

| I.P.dose mg./kg. | 2-amino-N-benzyl-4-methyl-5-thiazolecarboxamide | Chlorpromazine | Chlordiazepoxide |
|---|---|---|---|
| 0.5 | | 124 | |
| 1.0 | 10 | 240 | |
| 2.0 | | 300 | |
| 2.5 | 49 | | |
| 5.0 | 43 | | 26 |
| 10.0 | 189 | | 48 |
| 20.0 | | | 159 |
| 40.0 | | | 177 |

On a dose to dose relationship, 2-amino-N-benzyl-4-methyl-5-thiazolecarboxamide appears to have approximately one-fifteenth the potency of chlorpromazine. That is, 10 mg./kg. of 2-amino-N-benzyl-methyl-5-thiazolecarboxamide achieve a potency intermediate that achieved with 0.5 and 1 mg./kg. of chlorpromazine. On the other hand, at the same dosages (5 and 10 mg./kg.), 2-amino-N-benzyl-4-methyl-5-thiazolecarboxamide has approximately two to four times more potency than chlordiazepoxide. Therefore, this compound of the present invention shows potentiation of barbiturate anesthesia.

2. Dihydroxyphenylalanine (dl-DOPA) Fighting Test

It is well known that when monamine oxidase (MAO) inhibitors are given prior to the noradrenaline precursor dl-DOPA convulsions or excitation occur. In this study, the MAO inhibitor pargyline (80 mg./kg.) was given 1, 2, and 4 hours prior to administering 200 mg./kg. of dl-DOPA. Results of this experiment are manifested by excitation, salivation, jumping and fighting. When 2-amino-N-benzyl-4-methyl-5-thiazolecarboxamide (100 mg./kg.), chlorpromazine (5mg./kg.), or chlordiazepoxide (15 mg./kg.) were administered instead of pargyline, these symptoms were not observed. Thus, in this procedure, none of the agents tested appear to be MAO inhibitors.

3. Yohimbine Potentiation

Potentiation of lethality induced by the alpha-adrenergic blocking agent yohimbine is considered by some investigators as a reliable procedure to classify possible antidepressant compounds (R. M. Quinton, Brit. J. Pharmacol, 21: 51, 1963). An $ED_{50}$ in this test is defined as that dose of test drug which will cause the $LD_1$ (25 mg./kg. i.p.) of yohimbine to be converted to the $LD_{50}$ value. Groups of ten mice each are placed in a tote box and are injected with vehicle or test drug. Thirty minutes later each mouse is injected i.p. with yohimbine at 25 mg./kg. 60 minutes following yohimbine administration, the number of deaths in each tote box for each dose of test drug is recorded. (Vehicle-treated mice should have none or one of 10 mice dead.) Neither chlorpromazine (10 mg./kg.), chlordiazepoxide (20 mg./kg.), nor 2-amino-N-benzyl-4-methyl-5-thiazolecarboxamide (100 mg./kg.) was active in this test.

4. Antagonism of Tetrabenazine-induced Ptosis

Groups of mice were given 32 mg./kg. of tetrabenazine intraperitoneally 30 minutes after an injection of 2-amino-N-benzyl-4-methyl-5-thiazolecarboxamide (20 mg./kg.). The degree of ptosis (eyelid drooping or closure) was then determined exactly 30 minutes after tetrabenazine administration. 2-amino-N-benzyl-4-methyl-5-thiazolecarboxamide did not reverse tetrabenazine-induced ptosis as do the antidepressants desipramine and amitriptylene.

5. Oxotremorine Antagonism

Antagonism of the pharmacological effects of oxotremorine, a potent cholinergic stimulant, was studied in mice after intraperitoneal administration of 2-amino-N-benzyl-4-methyl-5-thiazolecarboxamide (100 mg./kg.). (F. Sjoquist and J. Gillette, Life Sci., 4: 1031, 1965). In this test, groups of ten mice are individually placed into plexiglas squares. Mice are injected i.p. with the vehicle or test drug 30 minutes prior to an i.p. injection of oxotremorine at 0.5 mg./kg. Immediately following oxxotremorine administration, the mice are observed for salivation and tremors. Peripheral anticholinergic activity is assessed by inhibition of salivation, and central activity by inhibition of tremors. At 100 mg./kg., 2-amino-N-benzyl-4-methyl-5-thiazolecarboxamide was completely devoid of any anti-cholinergic activity.

Cardiovascular Activity

Preliminary studies with the hydrochloride salt of 2-amino-N-benzyl-4-methyl-5-thiazolecarboxamide did not reveal any significant effect on the blood pressure or respiration of anesthetized dogs. There were no significant EKG changes. Pressor responses induced by epinephrine and norepinephrine were diminished after a cumulative dose of 10 mg./kg. i.v., indicating a weak alpha-adrenergic blocking activity, much weaker than that exhibited by chlorpromazine. The responses to injected acetylcholine, histamine and tyramine were unaltered. Thus, this compound is less potent than the major tranquilizer.

Toxicity

Table X gives the results of five day lethality studies following single injections of a drug. All values presented represent tests conducted when animals were housed 10 per cage. 2-amino-N-benzyl-4-methyl-5-thiazolecarboxamide is compared with chlorpromazine and chlordiazepoxide. In these and all the preceding calculations, the method of Litchfield and Wilcoxon (*J. Pharmacol, Exptl. Ther.* 96: 99, 1949) was used to estimate the effective ($ED_{50}$) or lethal ($LD_{50}$) dose.

TABLE X

| Agent | $LD_{50}$ (95% Confidence Limits) mg./kg. | | | |
|---|---|---|---|---|
| | MICE | | | RATS |
| | I.P. | P.O. | I.P. | P.O. |
| 2-amino-N-benzyl-4-methyl-5-thiazolecarboxamide | 400 (250 – 639) | 570 (460 – 705) | 206 (160 – 266) | >1500 |
| Chlorpromazine | 136 (106 – 174) | 280 (187 – 418) | 137 (133 – 141) | 357.7 (237.7 – 538.5) |
| Chlordiazepoxide | 400 (265 – 604) | 810 (688 – 958) | 265 (224 – 313) | 392.1 (235.5 – 753.5) |

These data show that 2-amino-N-benzyl-4-methyl-5-carboxamide is much less toxic than chlorpromazine in mice and rats when administered intraperitoneally or orally. Intraperitoneally, in both rats and mice, it has about the same toxicity as chlordiazepoxide. Orally, it is somewhat more toxic to mice than chlordiazepoxxide, but less toxic to rats, the $LD_{50}$ being greater than 1,500 mg./kg.

The compounds of the present invention, either alone or in the form of a pharmaceutical composition, may be administered to an an animal subject in any of a number of forms and via any of several routes. Thus, the compounds or compositions thereof may be orally administered in the form of tablets, pills, capsules or in the form of a solution or liquid suspension. They may also be administered in the form of a parenteral suspension or solution. The compounds or compositions thereof may also be administered rectally, in the form of a suppository.

When orally administering the compounds or compositions, use can be made of a tablet, pill or capsule consisting entirely of the desired compound, although ordinarily a composition comprising an effective amount of the compound and varying amounts of one or more physiologically inert materials such as carriers, vehicles, binders and the like will be used. Additionally, the compounds may be orally administered in the form of a suspension thereof in a suitable vehicle such as a syrup.

When parenterally administering the compounds or compositions, use may be made of a parenteral solution or suspension thereof in a suitable solvent or suspension medium.

The compounds and compositions of the present invention may also be administered rectally in the form of a suppository comprising an effective amount of the desired compound and a suitable vehicle such as petroleum jelly.

The following examples are specific formulations of compositions in accordance with the invention.

EXAMPLE 3

Tablets may be prepared by the compression of a wet granulation containing the following:

| Ingredients | In each |
|---|---|
| 2-amino-N-benzyl-4-methyl-thiazolecarboxamide | 25 mg. |
| Polyvinylpyrrolidone | 6 mg. |
| Lactose | 25 mg. |
| Alcohol, 3A, 200 proof | 1 ml. |
| Stearic acid | 3 mg. |
| Talc | 4 mg. |
| Corn Starch | 15 mg. |
| Dosage: 1 tablet 3 times a day | |

EXAMPLE 4

A liquid suspension for oral administration may be prepared in the following formulation:

| Ingredients | In each 5 cc. |
|---|---|
| 2-amino-N-benzyl-4-methyl-5-thiazolecarboxamide | 25 mg. |
| Sodium carboxymethylcellulose | 5 mg. |
| Syrup USP q.s to | 5 cc. |
| Dosage: 1 teaspoonful (5 cc.) every 4 hours. | |

EXAMPLE 5

Dry filled capsules (DFC) consisting of two sections of hard gelatin may be prepared from the following formulation:

| Ingredients | In each |
|---|---|
| 2-amino-N-benzyl-4-methyl-5-thiazolecarboxamide | 25 mg. |
| Lactose USP | q.s. |
| Dosage: 1 capsule 3 times a day. | |

EXAMPLE 6

A parenteral suspension for intra-muscular administration may be prepared in the following formulation:

| Ingredients | In each |
|---|---|
| 2-amino-N-benzyl-4-methyl-5-thiazolecarboxamide | 10 mg. |
| Isotonic solution (0.85% saline) | 5 cc. |
| Surfactant (a 1% solution of polysorbate 80 USP) | 1 cc. |
| Dosage: Inject 1 cc when needed | |

EXAMPLE 7

A suppository capsule may be formulated as below:

| Ingredients | In each |
| --- | --- |
| 2-amino-N-benzyl-4-methyl-5-thiazolecarboxamide | 25 mg. |
| Cocoa butter | q.s. |

Variations can, of course, be made without departing from the spirit and scope of the invention.

We claim:

1. A method of preventing or inhibiting aggressive behavior in an animal subject, said method comprising administering to an animal subject a thiazole compound selected from the group consisting of compounds of the formula

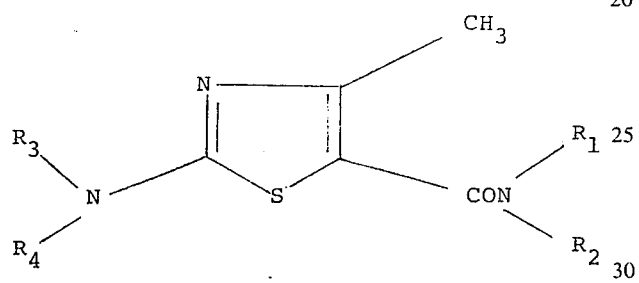

wherein $R_1$ is hydrogen, $R_2$ is benzyl, p-chlorobenzyl, p-methoxybenzyl, 2-phenylethyl, 2,6-dimethylphenyl, 2,6-diethylphenyl, 2,4,6-trimethylphenyl or phenyl, $R_3$ is hydrogen or N-nitroso and $R_4$ is hydrogen, methyl or ethyl, provided that only when $R_2$ is phenyl $R_3$ is N-nitroso; or $R_1$ is methyl, $R_2$ is benzyl and $R_3$ and $R_4$ are each hydrogen; or $R_1$ and $R_2$ are each n-butyl and $R_3$ and $R_4$ are each hydrogen; and their pharmaceutically acceptable acid addition salts, said thiazole compound being administered in an amount which is effective to prevent or inhibit aggressive behavior in an animal subject.

2. The method of claim 1, wherein said compound is administered to said animal in an orally administrable dosage form.

3. The method of claim 2, wherein said orally administrable dosage form in a pill, tablet or capsule.

4. The method of claim 2, wherein said orally administrable dosage form is a solution or suspension.

5. The method of claim 1, wherein said compound is administered to said animal in a parenterally administrable dosage form.

6. The method of claim 5, wherein said parenterally administrable dosage form is a solution or suspension.

7. The method of claim 1, wherein said compound is administered to said animal in a rectally administrable dosage form.

8. The method of claim 7, wherein said rectally administrable dosage form is a suppository.

9. The method of claim 1, wherein said effective amount is from about 0.1 to about 75 mg./kg. of body weight of said animal per day.

10. The method of claim 9, wherein said amount is from about 10 to about 40 mg./kg. of body weight per day.

11. The method of claim 9, wherein said amount is from about 0.1 to about 1 mg./kg. of body weight per day.

12. A method of preventing or inhibiting aggressive behavior in an animal subject said method comprising administering to such an animal subject 2-amino-N-benzyl-4-methyl-5-thiazolecarboxamide or its hydrochloride, said carboxamide being administered in an amount which is effective to prevent or inhibit aggressive behavior in an animal subject.

13. A pharmaceutical preparation in dosage unit form adapted for administration to prevent or inhibit aggressive behavior comprising an aggressive behavior preventing or inhibiting-effective non-toxic amount within the range from about 1 to about 75 mg/kg of body weight of a compound having the formula as hereinafter set forth:

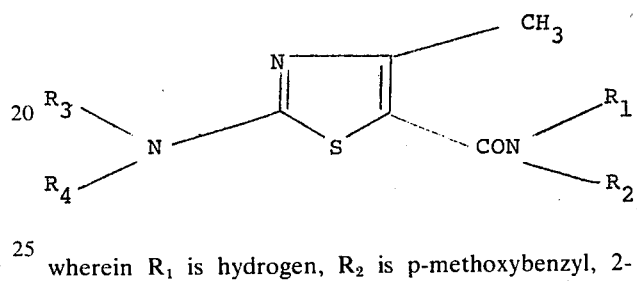

wherein $R_1$ is hydrogen, $R_2$ is p-methoxybenzyl, 2-phenylethyl, p-chlorobenzyl or phenyl, $R_3$ is hydrogen or N-nitroso and $R_4$ is hydrogen, methyl or ethyl, provided that only when $R_2$ is phenyl, $R_3$ is N-nitroso; or $R_1$ is methyl, $R_2$ is benzyl and $R_3$ and $R_4$ are each hydrogen, or a pharmaceutically acceptable acid addition salt thereof; in combination with a physiologically acceptable carrier and/or diluent therefor.

14. The composition of claim 13 in an orally administrable dosage form.

15. The composition of claim 14 wherein said orally administrable dosage form is a pill, tablet or capsule.

16. The composition of claim 15 wherein said pill, tablet or capsule comprises about 10 to 40 mg. of said compound.

17. The composition of claim 14 wherein said orally administrable dosage form is a suspension or solution.

18. The composition of claim 17 wherein said suspension or solution comprises about 5 mg. of said compound per cc.

19. The composition of claim 13 in a parenterally administrable dosage form.

20. The composition of claim 19 wherein said parenterally administrable dosage form comprises about 10 mg. of said compound per cc. of suspension or solution.

21. The composition of claim 13 is a rectally administrable dosage form.

22. The composition of claim 21 wherein said rectally administrable dosage form is a suppository.

23. The composition of claim 22 wherein said suppository contains about 10 to 40 mg. of said thiazole compound.

24. A pharmaceutical preparation in dosage unit form adapted for administration to prevent or inhibit aggressive behavior comprising an aggressive behavior preventing or inhibiting-effective non-toxic amount within the range from about 1 to about 75 mg/kg of body weight of 2-amine-N-benzyl-4-methyl-5-thiazolecarboxamide or its hydrochloride; in combination with a physiologically acceptable carrier and/or diluent therefor.

* * * * *